United States Patent
Zuo et al.

(10) Patent No.: US 10,451,023 B2
(45) Date of Patent: Oct. 22, 2019

(54) ENGINE, ENGINE STARTER AND HOUSING ASSEMBLY THEREOF

(71) Applicant: JOHNSON ELECTRIC INTERNATIONAL AG, Murten (CH)

(72) Inventors: Xiao Bing Zuo, Shenzhen (CN); Jun Jie Chu, Hong Kong (CN)

(73) Assignee: Johnson Electric International AG, Murten (CH)

( * ) Notice: Subject to any disclaimer, the term of this patent is extended or adjusted under 35 U.S.C. 154(b) by 244 days.

(21) Appl. No.: 15/446,273

(22) Filed: Mar. 1, 2017

(65) Prior Publication Data

US 2017/0254311 A1    Sep. 7, 2017

(30) Foreign Application Priority Data

Mar. 3, 2016  (CN) .......................... 2016 1 0120622

(51) Int. Cl.
| | | |
|---|---|---|
| *F02N 15/02* | (2006.01) | |
| *F02N 15/00* | (2006.01) | |
| *F02N 15/06* | (2006.01) | |
| *F16H 57/02* | (2012.01) | |
| *F02N 11/00* | (2006.01) | |
| *F02N 15/04* | (2006.01) | |

(52) U.S. Cl.
CPC ........... *F02N 15/02* (2013.01); *F02N 15/006* (2013.01); *F02N 15/067* (2013.01); *F02N 11/00* (2013.01); *F02N 15/022* (2013.01); *F02N 15/046* (2013.01); *F16H 57/02* (2013.01); *F16H 2057/02082* (2013.01)

(58) Field of Classification Search
CPC ...... F02N 15/02; F02N 15/067; F02N 15/046; F16H 57/02; F16H 2057/02082
See application file for complete search history.

(56) References Cited

U.S. PATENT DOCUMENTS

| | | | | | |
|---|---|---|---|---|---|
| 5,163,335 | A | * | 11/1992 | Isom ..................... | F02N 15/006 123/195 A |
| 5,222,401 | A | * | 6/1993 | Fasola ................... | F02N 15/067 335/131 |
| 5,307,700 | A | * | 5/1994 | Spellman .............. | F02N 15/067 74/7 A |
| 5,353,658 | A | * | 10/1994 | Nagashima ............ | F02N 15/06 74/7 A |
| 7,973,623 | B2 | * | 7/2011 | Andoh .................. | F02N 11/087 123/179.3 |
| 2004/0020315 | A1 | * | 2/2004 | Vilou .................... | F02N 15/067 74/7 A |

(Continued)

*Primary Examiner* — David M Fenstermacher
(74) *Attorney, Agent, or Firm* — Muncy, Geissler, Olds & Lowe, P.C.

(57) ABSTRACT

An engine, an engine starter and its housing assembly are provided. The housing assembly includes a gear mounting portion for mounting a driving gear and a switch mounting portion for mounting a solenoid switch. The switch mounting portion comprises a connecting portion and a cover body. The connecting portion is connected with the gear mounting portion and comprises a through structure for mounting the solenoid switch, the cover body covers a top end of the through structure. A wall of the connecting portion corresponding to the gear mounting portion defines an opening for mounting a shifting fork, which is in communication with the through structure.

2 Claims, 9 Drawing Sheets

(56) References Cited

U.S. PATENT DOCUMENTS

| | | | |
|---|---|---|---|
| 2009/0183595 A1* | 7/2009 | Niimi | F02N 15/067 |
| | | | 74/7 R |
| 2013/0081514 A1* | 4/2013 | Abe | F02N 11/0855 |
| | | | 74/7 C |
| 2013/0167686 A1* | 7/2013 | Kuwada | F02N 11/02 |
| | | | 74/7 C |
| 2014/0096642 A1* | 4/2014 | Gray | F02N 11/0855 |
| | | | 74/7 C |
| 2014/0260792 A1* | 9/2014 | Bradfield | F02N 11/0855 |
| | | | 74/7 A |

* cited by examiner

ENGINE, ENGINE STARTER AND HOUSING ASSEMBLY THEREOF

CROSS REFERENCE TO RELATED APPLICATIONS

This non-provisional patent application claims priority under 35 U.S.C. § 119(a) from Patent Application No. 201610120622.7 filed in The People's Republic of China on 3 Mar. 2016.

FIELD OF THE INVENTION

This invention relates to engine equipment, and in particular to an engine, an engine starter and a housing assembly thereof.

BACKGROUND OF THE INVENTION

With continuous improvement of modern energy devices, engines have been more and more widely used. Taking a ship engine as an example, the ship engine includes an engine starter for controlling startup of the engine.

The engine starter includes a housing assembly, a motor, a driving gear, a solenoid switch, and a shifting fork connecting the driving gear with the solenoid switch. Upon activation of the solenoid switch, the motor rotates at a low speed. Under the influence of an electromagnetic force produced by an electromagnetic coil in the solenoid switch, a push rod of the solenoid switch moves axially downward to drive the shifting fork to move, which in turn drives a pinion gear of the driving gear into engagement with a flywheel of the engine, and the motor starts to drive the engine to ignite.

Because the shifting fork needs to connect with the driving gear and the solenoid switch, the housing assembly defines a mounting slot through its inner and outer wall surfaces, and the mounting slot has an opening at a bottom end of the housing assembly. The shifting fork is mounted into the mounting slot from the opening, and an L-shaped sealing device is mounted in the mounting slot, with one end of the sealing device sealingly contact the shifting fork and the other end sealing the mounting slot.

However, only the sealing device is filled in a portion of the mounting slot other than a mounting slot portion in which the shifting fork is disposed, which reduces the strength of the housing assembly. In addition, after the shifting fork enters the mounting slot, it cannot be positioned correctly, which can easily lead to malposition of the shifting fork.

Therefore, how to increase the overall strength of the housing assembly and ensure correct mounting of the shifting fork has become an important issue to be addressed.

SUMMARY OF THE INVENTION

Thus, there is a desire for a housing assembly which can increase the overall strength of the housing assembly and ensure correct mounting of the shifting fork. There is also a desire for an engine starter and an engine having the housing assembly.

A housing assembly is provided which includes a gear mounting portion for mounting a driving gear and a switch mounting portion for mounting a solenoid switch. The switch mounting portion comprises a connecting portion and a cover body. The connecting portion is connected with the gear mounting portion and comprises a through structure for mounting the solenoid switch, and the cover body covers a top end of the through structure. A wall of the connecting portion corresponding to the gear mounting portion defines an opening for mounting a shifting fork, and the opening is in communication with the through structure.

Preferably, in the housing assembly, a sealing device is arranged between the connecting portion and the cover body.

Preferably, one of contacting surfaces between the connecting portion and the cover body is a flat surface, and the other defines a receiving slot for receiving the sealing device.

Preferably, in the housing assembly, the connecting portion and the cover body are connected to each other through a bolt. The connecting portion defines a first bolt hole, the cover body defines a second bolt hole corresponding to the first bolt hole, and the bolt passes through the first bolt hole and the second bolt hole.

Preferably, in the housing assembly, the flat surface is inclined toward the solenoid switch in a direction away from the gear mounting portion.

Preferably, in the housing assembly, the sealing device is a sealing ring.

Preferably, the housing assembly further comprises a positioning device disposed in the opening for avoiding malposition of the shifting fork.

Preferably, in the housing assembly, the connecting portion and the gear mounting portion are integrally cast-formed.

An engine starter is also provided which includes a housing assembly and a shifting fork disposed in the housing assembly. The housing assembly is in accordance with any of the above housing assemblies.

Preferably, in the engine starter, the shifting fork comprises a fork section and a positioning protrusion portion disposed at an end of the fork section; the positioning protrusion portion includes an upper protrusion portion extending between a top of the positioning protrusion portion and a top surface of the fork section, the upper protrusion portion has a height $D_1$, the positioning protrusion portion includes a lower protrusion portion extending between a bottom of the positioning protrusion portion and a bottom surface of the fork section, the lower protrusion portion has a height $D_2$; the opening of the housing assembly comprises an upper slot engaging with the upper protrusion portion, a lower slot engaging with the lower protrusion portion, and a guide slot allowing the fork section to pass therethrough, the upper slot has a height H1, the lower slot has a height H2; wherein, $D_1 \leq H_1$, $D_2 \leq H_2$, $\min(H_1, H_2) < \max(D_1, D_2)$.

An engine is also provided which includes the above engine starter.

As described above, the present invention provides a housing assembly. In assembly of the engine starter, the shifting fork is mounted through the opening, the solenoid switch is mounted from a bottom end of the through structure, a first connecting section of the shifting fork is connected to a push rod of the solenoid switch at a top end of the through structure, and the cover body is disposed to cover the top end of the through structure. In the housing assembly of the present invention, the switch mounting portion is formed by combining the connecting portion and the cover body, and the opening is defined in the wall of the connecting portion corresponding to the gear mounting portion. In comparison with the shifting fork mounting slot that is defined through one end of the housing assembly in the prior art, the overall strength of the housing assembly of this invention is effectively enhanced. In addition, the opening can be used to circumferentially position the shifting fork, and correct mounting of the shifting fork can thus be ensured.

The present invention further provides an engine starter and an engine having the above housing assembly. Because the above housing assembly has the above technical results, the engine starter and the engine having the housing assembly should also have the same technical results, explanations of which are not repeated herein.

BRIEF DESCRIPTION OF THE DRAWINGS

In order to more clearly describe the technical solutions in the prior art or the embodiments of the present invention, the accompanying drawings to be used in the descriptions of the prior art or the embodiments are briefly introduced as follows. Obviously, the following accompanying drawings just illustrate some embodiments of the present invention, and people skilled in the art can obtain other drawings from these drawings without paying creative efforts.

DETAILED DESCRIPTION OF THE PREFERRED EMBODIMENTS

The technical solutions of the embodiments of the present invention will be clearly and completely described as follows with reference to the accompanying drawings. Apparently, the embodiments as described below are merely part of, rather than all, embodiments of the present invention. Based on the embodiments of the present disclosure, any other embodiment obtained by a person skilled in the art without paying any creative effort shall fall within the protection scope of the present invention.

Figure 1:
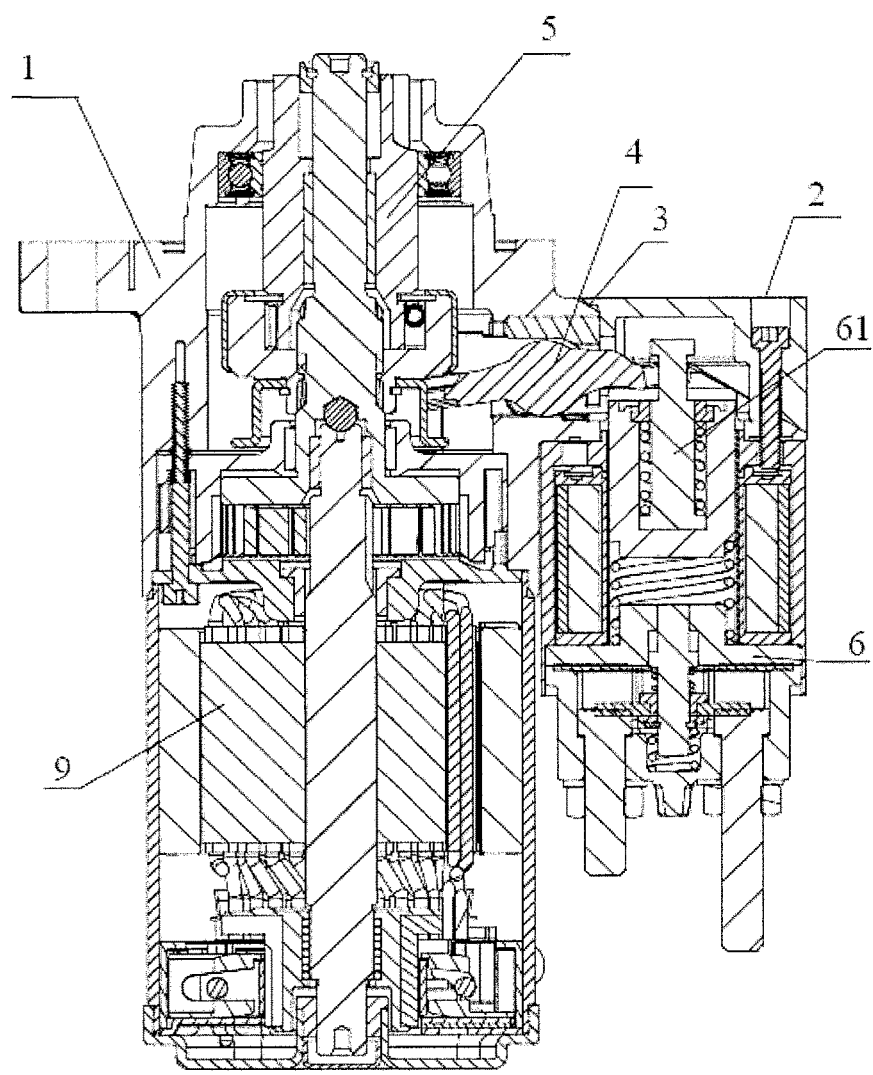
FIG. 1 illustrates an engine starter according to one embodiment of the present invention.
Figure 2:
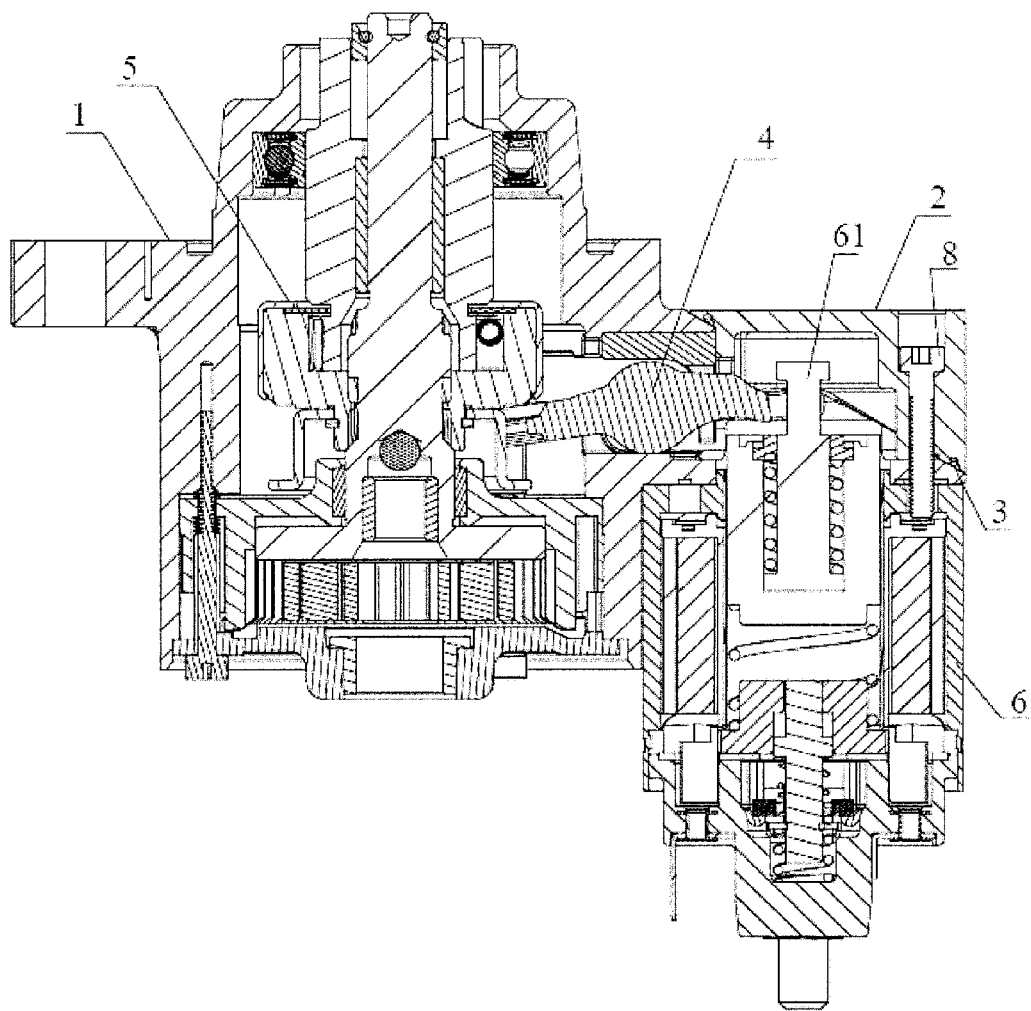
FIG. 2 illustrates the engine starter according to one embodiment of the present invention, with the motor removed.
Figure 3:
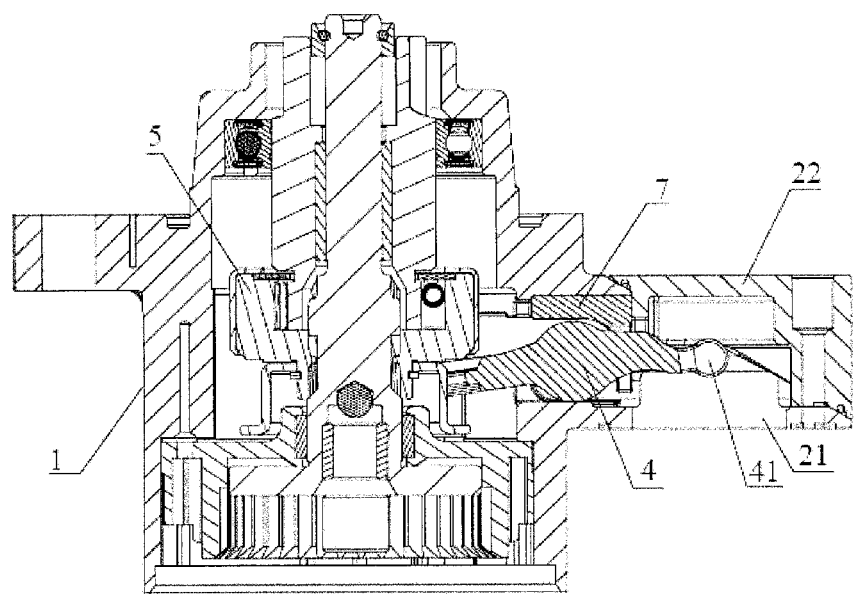
FIG. 3 is an assembled view of a housing assembly, a driving gear and a shifting fork according to one embodiment of the present invention.
Figure 4:
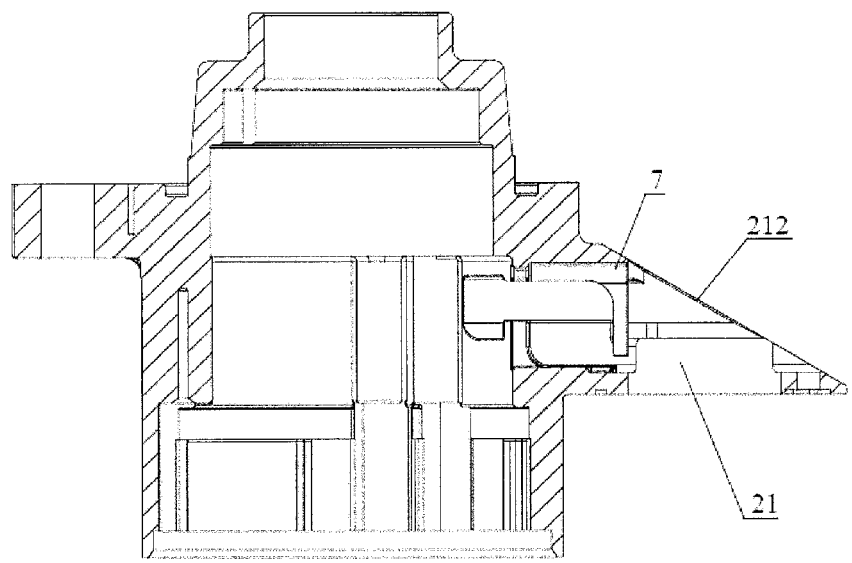
FIG. 4 illustrates a gear mounting portion and a connecting portion according to one embodiment of the present invention.
Figure 5:
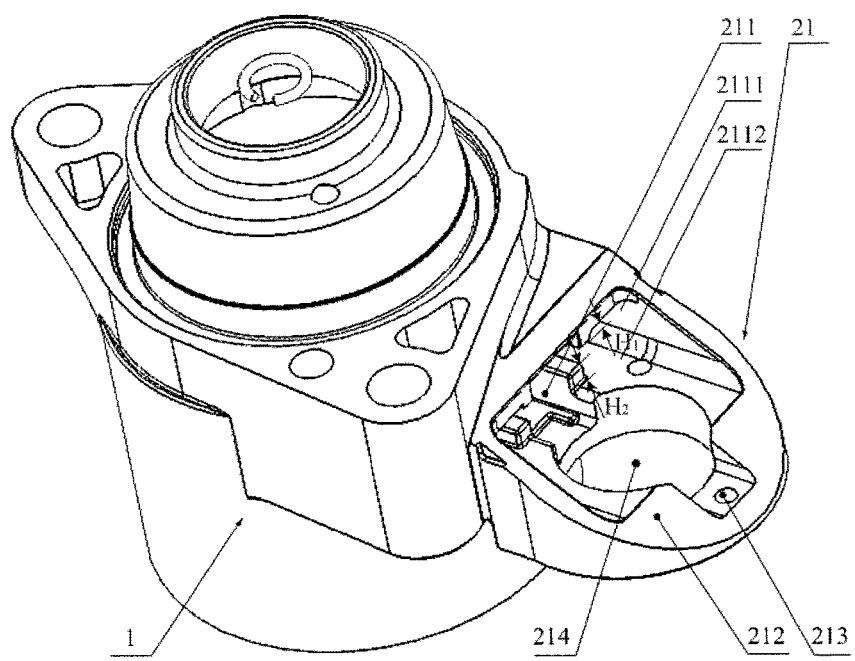
FIG. 5 is a side view of the gear mounting portion and the connecting portion according to one embodiment of the present invention.
Figure 6:
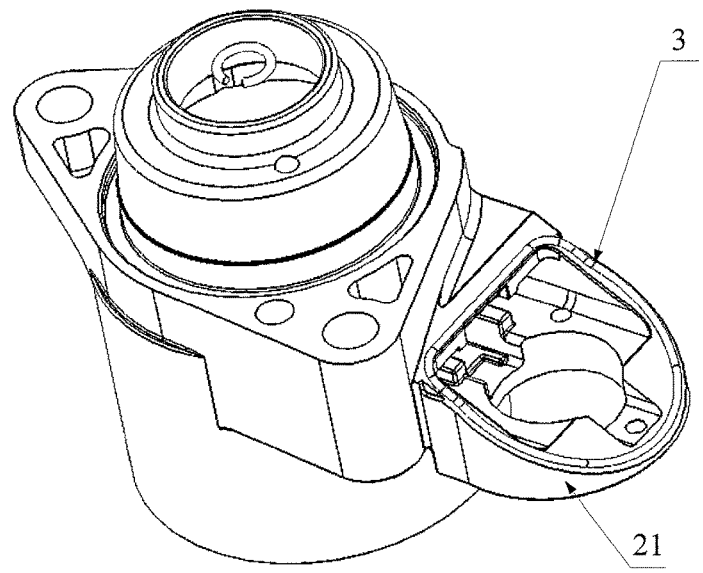
FIG. 6 illustrates the connecting portion and a sealing device according to one embodiment of the present invention.
Figure 7:
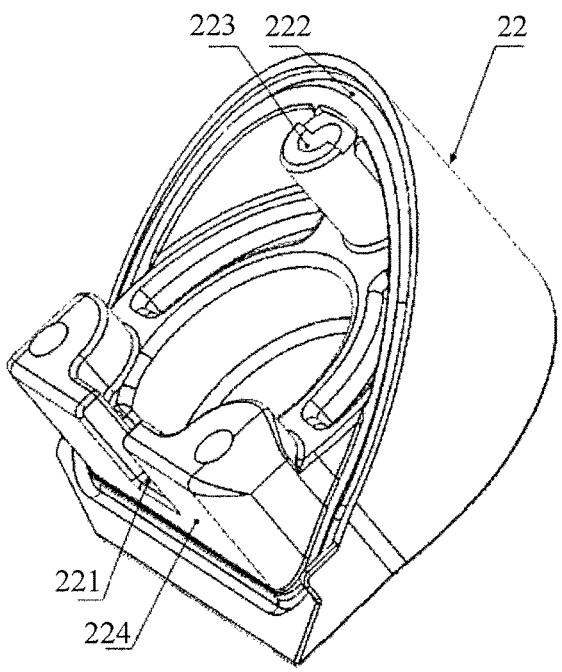
FIG. 7 illustrates a cover body according to one embodiment of the present invention.
Figure 8:
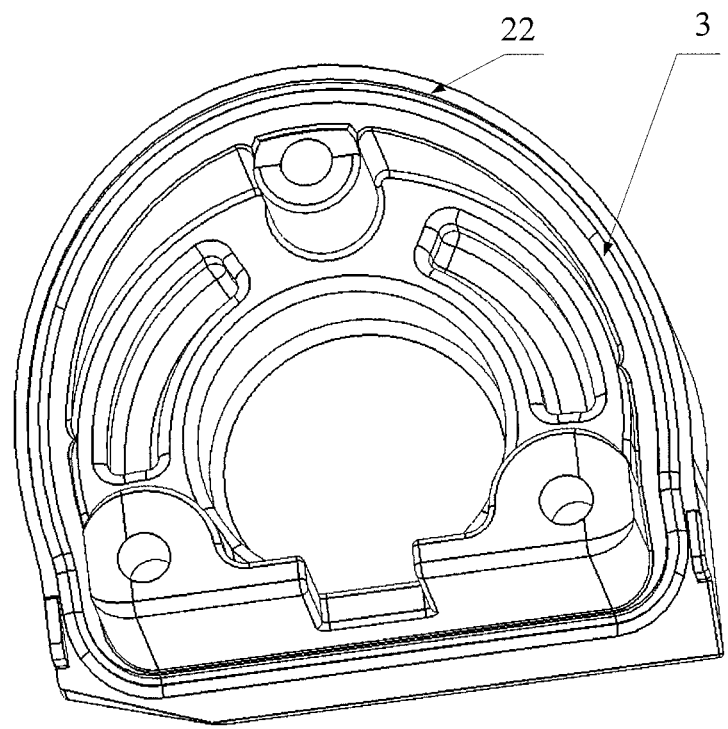
FIG. 8 illustrates the cover body and the sealing device according to one embodiment of the present invention.

Referring to FIG. 1 to FIG. 5, FIG. 1 illustrates an engine starter according to one embodiment of the present invention; FIG. 2 illustrates the engine starter according to one embodiment of the present invention, with the motor removed; FIG. 3 is an assembled view of a housing assembly, a driving gear and a shifting fork according to one embodiment of the present invention; FIG. 4 illustrates a gear mounting portion and a connecting portion according to one embodiment of the present invention; FIG. 5 is a side view of the gear mounting portion and the connecting portion according to one embodiment of the present invention.

A housing assembly in accordance with one embodiment of the present invention includes a gear mounting portion 1 for mounting a driving gear 5 and a switch mounting portion 2 for mounting a solenoid switch 6. In assembly of the engine starter, the driving gear 5 is mounted in the gear mounting portion 1, the solenoid switch 6 is mounted in the switch mounting portion 2, and the driving gear 5 and the solenoid switch 6 are connected through a shifting fork 4. The switch mounting portion 2 includes a connecting portion 21 and a cover body 22. The connecting portion 21 is connected with the gear mounting portion 1. The connecting portion 21 includes a through structure 214 allowing the solenoid switch 6 to be mounted therein. The cover body 22 covers on a top end of the through structure 214. An outer wall of the connecting portion 21 corresponding to the gear mounting portion 1 defines an opening 211 for mounting the shifting fork 4. The opening 211 is in communication with the through structure 214.

The shifting fork 4 is mounted through the opening 211, the solenoid switch 6 is mounted from a bottom end of the through structure 214, a toggle section 41 of the shifting fork 4 is connected to a push rod 61 of the solenoid switch 6 at a top end of the through structure 214, and the cover body 22 is disposed to cover the top end of the through structure 214. In the housing assembly of this embodiment, the switch mounting portion 2 is formed by the connecting portion 21 and the cover body 22, and the opening 211 is defined in the wall of the connecting portion 21 corresponding to the gear mounting portion 1. In comparison with the shifting fork mounting slot that is defined through one end of the housing assembly in the prior art, the overall strength of the housing assembly of this embodiment is effectively enhanced. In addition, the opening 211 can be used to circumferentially position the shifting fork 4, and correct mounting of the shifting fork 4 can thus be ensured.

In order to enhance the sealing effect, a sealing device 3 is disposed between the connecting portion 21 and the cover body 22. With the provision of the sealing device 3, the top end of the through structure 214 is sealed. After the solenoid switch 6 is assembled to the connecting portion 21, a bottom end of the through structure 214 is sealed, thus achieving the purpose of sealing the opening 211. In comparison with the L-shaped sealing ring in the prior art, the sealing structure of this embodiment is simplified, which facilitates the arrangement of the sealing device 3, thus effectively enhancing the sealing effect.

Referring to FIG. 4 to FIG. 8, one of contacting surfaces between the connecting portion 21 and the cover body 22 is a flat surface 212, and the other is formed with a receiving groove 222 for receiving the sealing device 3. When the sealing device 3 is disposed in the receiving groove 222, and the connecting portion 21 and the cover body 22 are assembled together, a portion of the sealing device 3 protruding out of the receiving groove 222 is contacted by the flat surface 212 and resiliently deforms, which effectively enhances the sealing between the connecting portion 21 and the cover body 22.

In this embodiment, the flat surface 212 is formed on the connecting portion 21, and the receiving groove 222 is formed in the cover body 22. Alternatively, the flat surface 212 may be formed on the cover body 22, and the receiving groove 222 is formed in the connecting portion 21.

In order to facilitate repair and maintenance of the solenoid switch 6, the connecting portion 21 and the cover body 22 are detachably connected. In this embodiment, the connecting portion 21 and the cover body 22 are connected through a bolt. The connecting portion 21 defines a first bolt hole 213, the cover body 22 defines a second bolt hole 223 corresponding to the first bolt hole 213, and the bolt 8 passes through the first bolt hole 213 and the second bolt hole 223.

Further, as shown in FIG. 2, the bolt 8 sequentially passes through the first bolt hole 213 and the second bolt hole 223, and one end of the bolt 8 extending out of the second bolt hole 223 is connected with the solenoid switch 6. That is, the bolt 8 not only connects the cover body 22 with the connecting portion 21, but it also connects the solenoid switch 6. By this configuration, mounting stability of the solenoid switch 6 is effectively enhanced.

In a direction away from the gear mounting portion 1, the flat surface 212 is inclined toward the solenoid switch 6 to facilitate mounting of various components. The bolt 8 is disposed at one end of the flat surface 212 away from the gear mounting portion 1.

Figure 9:
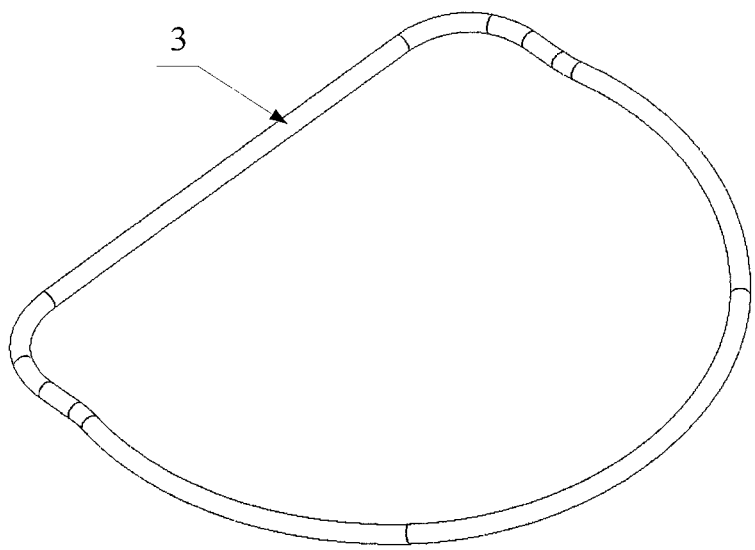
FIG. 9 illustrates the sealing device according to one embodiment of the present invention.
Figure 10:
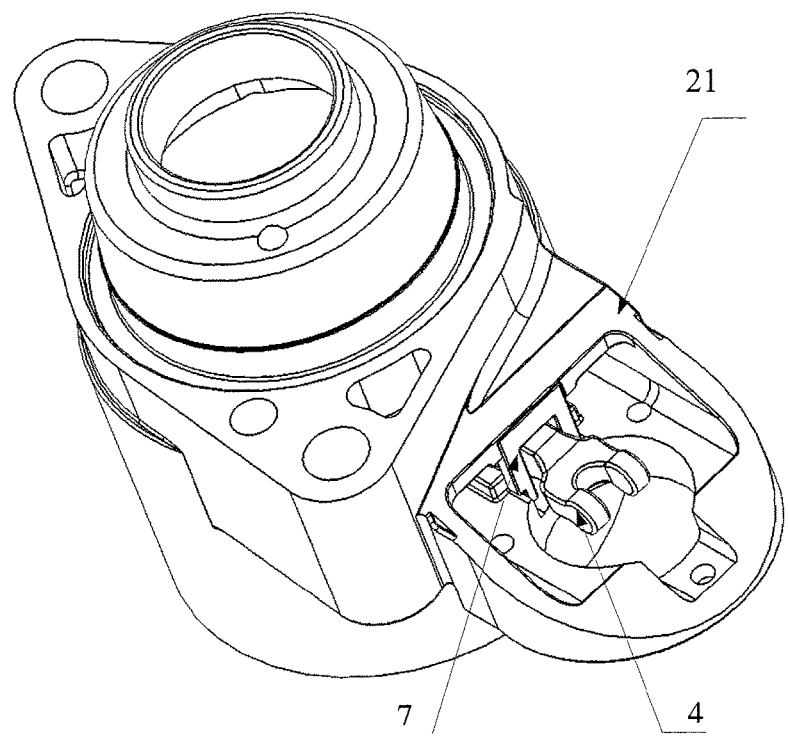
FIG. 10 is an assembled view of the connecting portion, the shifting fork and the positioning device according to one embodiment of the present invention.

Referring to FIG. 9, the sealing device 3 is preferably an O-ring or in another form. Configuring the sealing device 3 as the sealing ring can effectively facilitate the mounting of the sealing device 3. The sealing device 3 may alternatively be implemented as a packing seal structure, which is not described herein in further detail and also falls within the scope of this invention.

The housing assembly of this embodiment further includes a positioning device 7 disposed in the opening 211 for avoiding malposition of the shifting fork 4. With the provision of the positioning device 7, the malposition of the shifting fork 4 can be effectively avoided.

In this embodiment, referring to FIG. 10 to FIG. 13, the positioning device 7 has a first slot 72 allowing the toggle section 41 of the shifting fork 4 connected with the solenoid switch 6 to extend out. It should be understood that a fork section 43 of the shifting fork 4 is located within the gear mounting portion 1, corresponding to the driving gear 5. A connecting section between the toggle section 41 and a rotating section 42 may be disposed in the first slot 72, but the toggle section 41 and the rotating section 42 cannot move through the first slot 72. With the provision of the positioning device 7, malposition of the shifting fork 4 can be effectively avoided and the positioning effect of the shifting fork 4 can be enhanced.

Further, an inner side of the positioning device 7 forms a curved surface 73 for engaging with the rotating section 42 of the shifting fork 4. The provision of the curved surface 73 reduces friction loss between the shifting fork 4 and the positioning device 7, and makes the rotation of the shifting fork 4 smoother.

The positioning device 7 forms a positioning surface 71 at one side of the positioning device 7 facing the through structure 214. The cover body 22 includes a positioning portion 224 extending into the through structure 214 and contacting with the positioning surface 71 to position the positioning device 7. The positioning portion 224 defines a second slot 221 corresponding to the first slot 72. In assembly, the toggle section 41 of the shifting fork 4 passes through the second slot 221 to connect with the push rod 61 of the solenoid switch 6, and the positioning portion 224 extends into the through structure 214, with one end surface of the positioning portion 224 facing the opening 211 abutting against the positioning surface 71, thereby positioning the positioning device 7 and avoiding loose connection or falling off of the positioning device 7 from the opening 211, which indirectly enhances the positioning of the shifting fork 4. It should be understood that it not intended to limit the positioning device 7 in its construction to that illustrated herein, and the positioning device 7 may be also positioned below the shifting fork 4 or around the shifting fork 4 in a circumferential direction thereof.

Preferably, the connecting portion 21 and the gear mounting portion 1 are integrally cast-formed. Alternatively, the connecting portion 21 and the gear mounting portion 1 may also be connected through welding or another connecting manner, which is not described herein in detail.

An embodiment of the present invention further provides an engine starter including a housing assembly and a shifting fork 4 disposed in the housing assembly. The housing assembly is any one of the housing assemblies described above. Because the above housing assembly has the above technical results, the engine starter having the housing assembly should also have the same technical results, explanations of which are not repeated herein.

As shown in FIG. 1, the engine starter in accordance with one embodiment of the present invention includes the housing assembly, a motor 9, the driving gear 5, the solenoid switch 6, and the shifting fork 4 for connecting the solenoid switch 6 with the driving gear 5.

Figure 11:
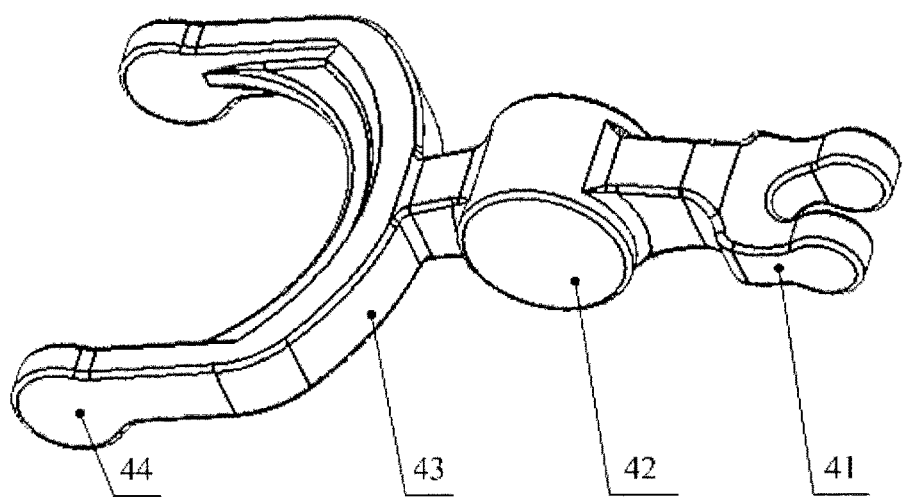
FIG. 11 illustrates the shifting fork according to one embodiment of the present invention.
Figure 12:
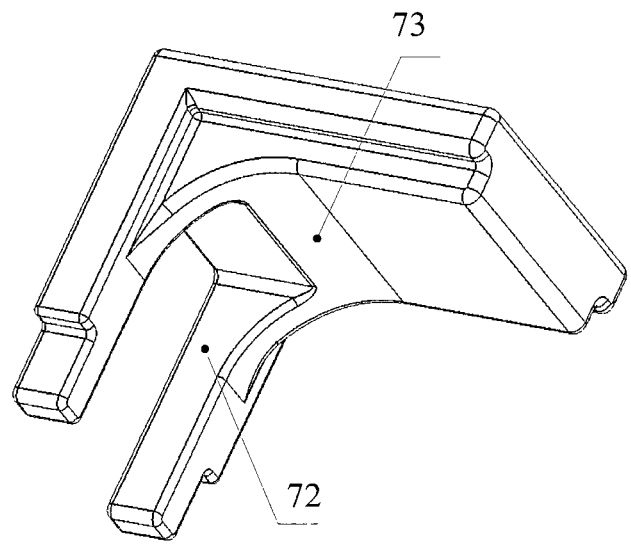
FIG. 12 illustrates a first structure of the positioning device according to one embodiment of the present invention.
Figure 13:
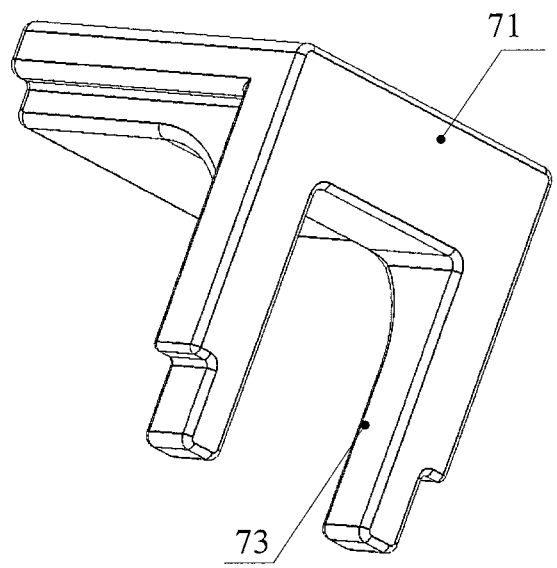
FIG. 13 illustrates a second structure of the positioning device according to one embodiment of the present invention.

Referring to FIG. 11, the shifting fork 4 includes the fork section 43 and positioning protrusion portions 44 disposed at ends of the fork section 43. In this embodiment, the shifting fork 4 is formed by the toggle section 41, rotating portion 42, the fork section 43 and the positioning protrusion portions 44 that are sequentially connected. The toggle section 41 is connected with the solenoid switch 6. The fork section 43 supports a pinion gear of the driving gear 5 with its positioning protrusion portions 44.

Figure 14:
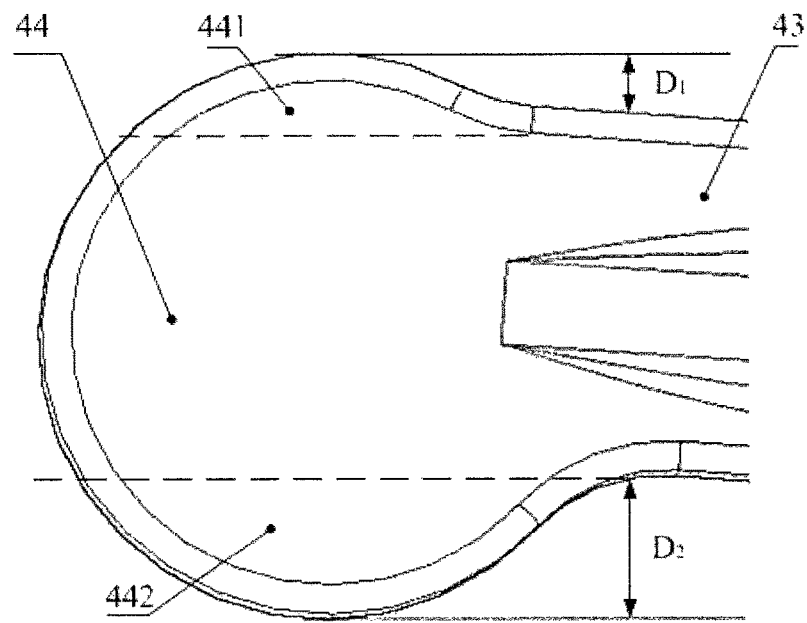
FIG. 14 illustrates a positioning protrusion portion according to one embodiment of the present invention.
Figure 15:
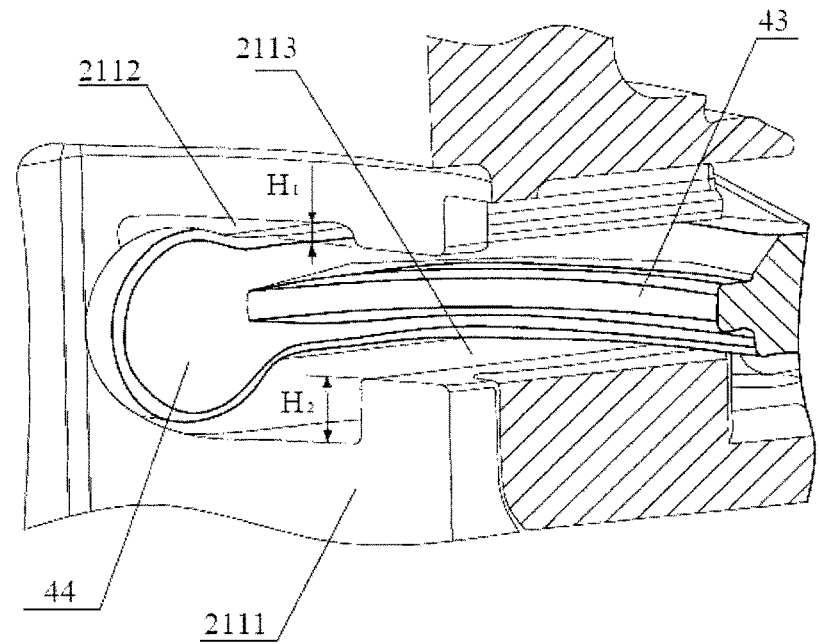
FIG. 15 is an assembled view of the shifting fork and the opening according to one embodiment of the present invention.

Referring to FIG. 5, FIG. 14 and FIG. 15, each positioning protrusion portion 44 includes an upper protrusion portion 441 extending between a top of the positioning protrusion portion 44 and a top surface of the fork section 43, and the upper protrusion portion 441 has a height $D_1$. Each positioning protrusion portion 44 includes a lower protrusion portion 442 extending between a bottom of the positioning protrusion portion 44 and a bottom surface of the fork section 43, and the lower protrusion portion 442 has a height $D_2$. That is, the distance between the top of the positioning protrusion portion 44 and the top surface of the fork section 43 is $D_1$, and the distance between the bottom of the positioning protrusion portion 44 and the bottom surface of the fork section 43 is $D_2$.

The opening 211 of the housing assembly has an upper slot 2111 for engagement with the upper protrusion portion 441, a lower slot 2112 for engagement with the lower protrusion portion 442, and a guide slot 2113 for allowing the fork section 43 to pass therethrough. The fork section 43 is connected with the positioning protrusion portions 44. Therefore, the upper slot 2111, the lower slot 2112, and the guide slot 2113 are in communication with each other.

In mounting the shifting fork 4 through the opening 211, the fork section 43 slides along the guide slot 2113, and the positioning protrusion portions 44 slide along slideways defined by the upper slot 2111 and the lower slot 2112. The guide slot 2113 provides a guiding function to the fork section 43, and the guide slot 2113 has a height less than a height of the positioning protrusion portion 44 (i.e. a distance between the top and bottom of the positioning protrusion portion 44). The upper slot 2111 engages with the upper protrusion portion 441, the lower slot 2112 engages with the lower protrusion portion 442, the upper slot 2111 has a height $H_1$, and the lower slot has a height $H_2$. Preferably, $D_1 \leq H_1$, $D_2 \leq H_2$, $\min(H_1, H_2) < \max(D_1, D_2)$, i.e. the smaller one of $H_1$ and $H_2$ is less than the bigger one of $D_1$ and $D_2$.

Taking this embodiment as an example, $D_1 < D_2$, and $H_1 < H_2$. Therefore, $H_1 < D_2$. If the shifting fork 4 is mounted upside down, the upper protrusion portion 441 engages with the lower slot 2112, and the lower protrusion portion 442 engages with the upper slot 2111. Because $H_1 < D_2$, the lower protrusion portion 442 cannot pass through the upper slot 2111, which effectively avoids the upside-down mounting of the shifting fork 4.

Likewise, in another embodiment, if $D_2 < D_1$ and $H_2 < H_1$, then $H_2 < D_1$, which makes the upper protrusion portion 441 unable to pass through the lower slot 2112, thereby likewise avoiding the upside-down mounting of the shifting fork 4.

An embodiment of the present invention further provides an engine including the above engine starter. Because the above engine starter has the above technical results, the engine having the engine starter should also have the same technical results, explanations of which are not repeated herein.

All embodiments in the specification are described in a progressive way, each embodiment mainly describes the differences from other embodiments, and the same and similar parts among the embodiments can be referenced mutually.

Although the invention is described with reference to one or more embodiments, the above description of the embodiments is used only to enable people skilled in the art to practice or use the invention. It should be appreciated by those skilled in the art that various modifications are possible without departing from the spirit or scope of the present invention. The embodiments illustrated herein should not be interpreted as limits to the present invention, and the scope of the invention is to be determined by reference to the claims that follow.

The invention claimed is:

1. An engine starter comprising:
   a housing assembly comprising:
      a gear mounting portion for mounting a driving gear; and
      a switch mounting portion for mounting a solenoid switch, the switch mounting portion comprising:
         a connecting portion connected with the gear mounting portion and comprising a through structure for mounting the solenoid switch, a wall of the connecting portion corresponding to the gear mounting portion defining an opening in communication with the through structure; and
         a cover body covering a top end of the through structure; and
      a shifting fork disposed in the opening;
   wherein the shifting fork comprises a fork section and a positioning protrusion portion disposed at an end of the fork section;
   the positioning protrusion portion includes an upper protrusion portion extending between a top of the positioning protrusion portion and a top surface of the fork section, the upper protrusion portion has a height $D_1$, the positioning protrusion portion includes a lower protrusion portion extending m of the positioning protrusion portion and a bottom surface of the fork section, the lower protrusion portion has a height $D_2$;
   the opening of the housing assembly comprises an upper slot engaging with the upper protrusion portion, a lower slot engaging with the lower protrusion portion, and a guide slot allowing the fork section to pass therethrough, the upper slot has a height $H_1$, the lower slot has a height $H_2$;
   wherein, $D_1 \leq H_1$, $D_2 \leq H_2$, $\min(H_1, H_2) < \max(D_1, D_2)$.

2. An engine comprising an engine starter, the engine starter comprising:
   a housing assembly comprising:
      a gear mounting portion for mounting a driving gear; and
      a switch mounting portion for mounting a solenoid switch, the switch mounting portion comprising:
         a connecting portion connected with the gear mounting portion and comprising a through structure for mounting the solenoid switch, a wall of the connecting portion corresponding to the gear mounting portion defining an opening in communication with the through structure; and
         a cover body covering a top end of the through structure; and
      a shifting fork disposed in the opening;
   wherein the shifting fork comprises a fork section and a positioning protrusion portion disposed at an end of the fork section;
   the positioning protrusion portion includes an upper protrusion portion extending between a top of the positioning protrusion portion and a top surface of the fork section, the upper protrusion portion has a height $D_1$, the positioning protrusion portion includes a lower protrusion portion extending between a bottom of the positioning protrusion portion and a bottom surface of the fork section, the lower protrusion portion has a height $D_2$;
   the opening of the housing assembly comprises an upper slot engaging with the upper protrusion portion, a lower slot engaging with the lower protrusion portion, and a guide slot allowing the fork section to pass therethrough, the upper slot has a height $H_1$, the lower slot has a height $H_2$;
   wherein, $D_1 \leq H_1$, $D_2 \leq H_2$, $\min(H_1, H_2) < \max(D_1, D_2)$.

* * * * *